United States Patent [19]

MacLean et al.

[11] Patent Number: 4,752,311
[45] Date of Patent: * Jun. 21, 1988

[54] ARGON RECOVERY FROM AMMONIA PLANT PURGE GAS UTILIZING A COMBINATION OF CRYOGENIC AND NON-CRYOGENIC SEPARATING MEANS

[75] Inventors: Donald L. MacLean, Annandale; Ramachandran Krishnamurthy, Piscataway; Steven L. Lerner, Berkeley Heights, all of N.J.

[73] Assignee: The BOC Group, Inc., Montvale, N.J.

[*] Notice: The portion of the term of this patent subsequent to Aug. 25, 2004 has been disclaimed.

[21] Appl. No.: 45,347

[22] Filed: May 4, 1987

Related U.S. Application Data

[63] Continuation-in-part of Ser. No. 832,206, Feb. 24, 1986, Pat. No. 4,689,062.

[51] Int. Cl.$^4$ ............................................. F25J 3/00
[52] U.S. Cl. ........................................... 62/18; 55/66; 62/22
[58] Field of Search ............... 62/9, 11, 17, 18, 22; 55/66, 68, 74, 75, 25

[56] References Cited

U.S. PATENT DOCUMENTS

| | | | |
|---|---|---|---|
| 2,944,627 | 7/1960 | Skarstrom . | |
| 3,349,569 | 10/1967 | Nebgen | 62/17 |
| 3,553,972 | 1/1971 | Markbreiter et al. | 62/18 |
| 3,801,513 | 4/1974 | Munzner et al. . | |
| 3,807,185 | 4/1974 | Forg et al. | 62/22 |
| 3,838,553 | 10/1974 | Doherty | 55/66 X |
| 3,960,522 | 6/1976 | Munzner et al. | 55/68 |
| 4,266,957 | 5/1981 | Isalski | 62/18 |
| 4,340,398 | 7/1982 | Doshi et al. | 55/25 |
| 4,415,340 | 11/1983 | Knoblauch et al. | 55/25 |
| 4,548,618 | 10/1985 | Linde et al. | 55/68 X |
| 4,549,890 | 10/1985 | Bligh | 62/18 |
| 4,654,063 | 3/1987 | Auvil et al. | 62/18 |
| 4,689,062 | 8/1987 | MacLean et al. | 62/18 |

FOREIGN PATENT DOCUMENTS

| | | |
|---|---|---|
| 1446201 | 8/1976 | United Kingdom . |
| 1559325 | 1/1980 | United Kingdom . |

OTHER PUBLICATIONS

M. Ruhemann, "New Developments in the treatment of ammonia purge gas", Indian Journal of Cryogenics, vol. 7, No. 3, 1982, pp. 111-116.

Primary Examiner—Steven E. Warner
Attorney, Agent, or Firm—R. Hain Swope; Chris P. Konkol; Larry R. Cassett

[57] ABSTRACT

An improved high yield process is disclosed for argon recovery from an ammonia synthesis plant purge gas comprising hydrogen, nitrogen, argon, ammonia, and methane. In one embodiment of the present invention, this purge gas is subjected to the following steps:

(i) Separation of ammonia at high pressure by adsorption using zeolite molecular sieve material, which is subsequently regenerated by hot purge combined with pressure reduction;

(ii) Separation of methane and most of the nitrogen by pressure swing adsorption using a molecular sieve or an activated carbon material having greater selectivity for methane than argon;

(iii) Separation of hydrogen for recycle to the ammonia synthesis plant using a high pressure cryogenic distillation column or a membrane separator; and (iv) Separation of the nitrogen by cryogenic distillation means to obtain essentially pure liquid argon product.

23 Claims, 12 Drawing Sheets

FIG. 9

| VALVE POSITION \ TIME (SEC) | 10 | 4 | 6 | 40 | 110 | 10 | 10 | 4 | 6 | 40 | 110 | 10 |
|---|---|---|---|---|---|---|---|---|---|---|---|---|
| FEED TO BED A  01 | | | | | | | ■ | ■ | ■ | ■ | ■ | ■ |
| FEED TO BED B  02 | ■ | ■ | ■ | ■ | ■ | ■ | | | | | | |
| BOTTOM BALANCE 03 | ■ | | | | | | ■ | | | | | |
| BOTTOM BALANCE 04 | ■ | | | | | | ■ | | | | | |
| RECYCLE VENT "A" 05 | | | | | | | | | | ■ | | |
| RECYCLE VENT "B" 06 | | | | ■ | | | | | | | | |
| VENT "A" 07 | | | | | | | | | | | ■ | ■ |
| VENT "B" 08 | | | | ■ | ■ | | | | | | | |
| BED A TO EQ. TANK 09 | | | | | | | | | | | ■ | |
| BED B TO EQ. TANK 10 | | | | | ■ | | | | | | | |
| PURGE GAS TO A 11 | | | | | | | | | | ■ | | |
| PURGE GAS TO B 12 | | | | ■ | | | | | | | | |
| TOP BALANCE 13 | ■ | | | | | | ■ | | | | | |
| TOP BALANCE 14 | ■ | | | | | | ■ | | | | | |
| BACKFILL-BED A 15 | | | | | | | | | | | ■ | ■ |
| BACKFILL-BED B 16 | | | | | ■ | ■ | | | | | | |
| PRODUCT TO BACKFILL 17 | | | | | ■ | ■ | | | | | ■ | ■ |

FULL CYCLE SEQUENCE

☐ OPEN    ▨ CLOSED

ARGON RECOVERY FROM AMMONIA PLANT PURGE GAS UTILIZING A COMBINATION OF CRYOGENIC AND NON-CRYOGENIC SEPARATING MEANS

This application is a continuation-in-part of U.S. Ser. No. 06/832,206 filed on Feb. 24, 1986 now U.S. Pat. No. 4,689,062.

BACKGROUND OF THE INVENTION

Economic production of argon via air separation plants is linked to the production of equivalent quantities of nitrogen or oxygen or both. In recent years, however, the demand for argon has been growing at a more rapid rate than the corresponding growth rate of either nitrogen or oxygen. Alternative sources for argon production have thus become attractive. One such alternative source is the purge gas from ammonia synthesis plants.

In an ammonia synthesis plant, it becomes necessary to purge a fraction of the gas stream in order to maintain the inert concentration below a specified level. Higher inert levels reduce the partial pressure of the reactants and cause an unfavorable shift of the ammonia synthesis reaction equilibrium. Methane and argon constitute the inert gases of concern. A typical composition of the ammonia purge gas available at approximately 1900 psig pressure is as follows: 60.5% $H_2$, 20% $N_2$, 4.5% Ar, 13% $CH_4$ and 2% $NH_3$. Depending on the ammonia plant design, the purge gas may be available at much higher pressures or at slightly different compositions.

Present technology for argon recovery from ammonia plant purge gas employs a cryogenic process that consists of a pre-treatment section for ammonia removal and three cryogenic distillation columns. The first two columns are for stripping hydrogen and nitrogen in the feed gas and the final column is for separating argon and methane to obtain pure liquid argon product and also pure methane for use as fuel.

The primary object of the invention was to develop an improved process for recovering argon from ammonia synthesis plant purge gas. A further object of the present invention was to develop a process employing an advantageous combination of non-cryogenic and cryogenic steps for argon recovery from an ammonia synthesis plant purge gas. Yet a further object of the present invention was to utilize a PSA system to accomplish removal of methane from the purge gas exiting an ammonia synthesis plant.

In the following description of the invention, the term "pressure swing adsorption" or its acronym "PSA" is used in reference to a type of process and apparatus that is now well known and widely used with respect to separating the components of a gaseous mixture. A PSA system basically comprises passing a feed gas mixture through one or more adsorption beds containing a sieve material which has greater selectivity for more strongly adsorbed components than more weakly adsorbed components of the gas mixture. In the normal operation of a typical 2-bed PSA system, the connecting conduits, valves, timers, and the like are coordinated and arranged so that when adsorption is occurring in a first bed, regeneration is occurring in a second bed. In the usual cycle, sequential steps with respect to each adsorption bed include bed pressurization, product release and bed regeneration. Basic PSA systems are described in U.S. Pat. Nos. 2,944,627, 3,801,513, and 3,960,522.

Various modifications and improvements to the basic PSA process and apparatus have been described in the literature, for example, in U.S. Pat. No. 4,415,340, issued on Nov. 15, 1983 and U.S. Pat. No. 4,340,398 issued on July 20, 1982. The present invention is not limited to the use of any particular PSA process or apparatus design. A design that results in high argon yield, however, is detailed below as an example.

A new and improved process has been developed for recovering argon from the purge gas flowing from an ammonia synthesis plant. This process employs a non-cryogenic means comprised of a pressure swing adsorption (PSA) unit for accomplishing a critical separation between argon and methane as well as removing most of the nitrogen.

The present invention has several important advantages over the three stage prior art cryogenic recovery of argon. A considerable reduction in capital cost and operating expense is achieved through the use of a gas phase methane separation. In fact, the high pressure of the purge gas exiting from the ammonia plant can be used to provide most or all of the energy requirements used in the non-cryogenic separation. Furthermore, it is possible, as a further energy saving measure, to pass the purge gas stream through a turbine in order to provide cooling needed for the later cryogenic separation. Further advantages of the present process stem from the use of PSA units for ammonia separation and for methane separation ahead of a membrane for hydrogen separation. The ammonia purge stream is at a cold temperature (about $-10°$ F.), at which pressure swing adsorption is more effective. Because of the heats of adsorption, the product gas from the PSA units will be warmer. Membranes operate more effectively at higher temperatures (about 70° F.). The temperatures noted here are for an ammonia plant operating at about 2000 psia and may be slightly different in the event the plant is designed to operate at other pressures.

Another advantage of the present invention is that it offers the option of separating ammonia simultaneously with methane and nitrogen in a single PSA system. This option is advantageous when ammonia in the feed is at such low concentrations that the recovery or recycle of ammonia in the purge gas is not critical. Expensive ammonia separation equipment are then eliminated, making the process even more cost effective. Finally, the compact units employed in the present process are more portable and, as a result, the purge gas available at numerous ammonia plant sites over a wide geographical range can be more expeditiously tapped for argon in order to meet the growing demand for this industrial gas.

BRIEF DESCRIPTION OF THE INVENTION

A first embodiment of the process of the present invention involves the following stages:

(1) Ammonia from ammonia synthesis plant purge gas is removed by controlled adsorption at high pressures, on the order of 1100 psig, using zeolite molecular sieve material. Regeneration of this material is carried out by purge with a hydrogen rich stream produced in the overall process. The hydrogen rich stream is optionally heated. Purge is combined with pressure reduction to approximately 400 psig. The removed ammonia may be recycled to the ammonia synthesis plant.

(2) The product gas, following ammonia adsorption, is passed to a PSA unit where essentially all of the methane and most of the nitrogen are removed by using an adsorbent material possessing the necessary selectivity.

(3) The product gas from the PSA system is passed to a cryogenic distillation unit consisting of two cryogenic distillation columns. In the first column, hydrogen is separated; most of the hydrogen rich stream is directly recycled, although a portion thereof may be used as the purge gas for regeneration in the ammonia adsorption step and then recycled. In the second column, pure liquid argon is produced as a bottom product, whereas a nitrogen product with small amounts of hydrogen is the distillate. The argon usually lost in the vent gas of the PSA unit is substantially recovered in accordance with this invention by: recycling the vent gas (1) to the ammonia plant secondary reformer; (2) to the PSA unit with the feed; or (3) recycling a cocurrent depressurization product of the PSA unit to the PSA unit feed.

In an alternative embodiment, the product gas from the PSA unit is sent to a membrane separator for hydrogen removal and recycle. Part of the hydrogen stream may be used for regeneration in the ammonia adsorption step and then recycled. The non-permeate gas consisting of nitrogen and argon is then cryogenically treated in a single column to produce pure liquid argon.

Although ammonia adsorption is preferred, a conventional method for ammonia removal may be employed, in which the purge gas is scrubbed with water and the ammonia-water mixture is then separated by fractionation. Residual moisture in the gas leaving the scrubber can be removed by adsorption if the downstream processing cannot tolerate water content.

If ammonia in the feed is in small amounts and it is not critical to recover or recycle the same, then the ammonia adsorption of step (1) may be combined in a single PSA unit with the methane and nitrogen separation of step (2).

BRIEF DESCRIPTION OF THE DRAWINGS

The invention will be more clearly understood by reference to the following description of exemplary embodiments thereof in conjunction with the following drawings in which:

FIG. 9 is a timing diagram illustrating a full cycle sequence of PSA operation corresponding to the configuration shown in FIG. 7 and employing the second recycle option.

DETAILED DESCRIPTION OF THE INVENTION

Figure 1:
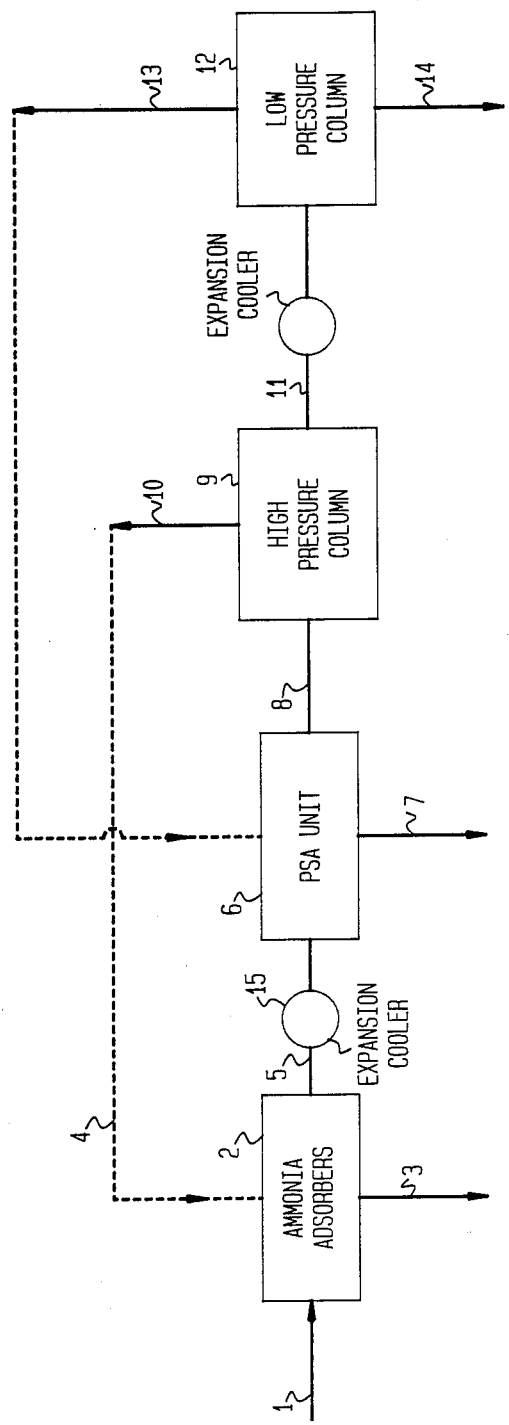
FIG. 1 discloses a schematic flow diagram, according to one embodiment of the present invention, of a process for recovering argon from an ammonia synthesis plant purge gas.

Referring to FIG. 1, ammonia synthesis plant purge gas stream 1, at 1900 psig and comprising approximately 60.5% hydrogen, 20% nitrogen, 13% methane, 4.5% argon, and 2% ammonia, enters a molecular sieve ammonia adsorption unit 2 operating at an elevated pressure. The unit 2 is regenerated by purge with a gas consisting of optionally heated hydrogen coupled with pressure reduction to 400 psig. The purge gas is part of the distillate stream exiting the cryogenic column 9. The ammonia removed by unit 2 exits as stream 3 along with the gas used to purge the unit, and is recycled to the ammonia synthesis loop at 400 psig.

The product stream 5, following removal of ammonia in adsorption unit 2, and optional cooling by expansion means 15, such as a turbine, enters a pressure swing adsorption (PSA) unit 6 for removal of essentially all of the methane and most of the nitrogen. The PSA unit 6 contains a molecular sieve adsorbent material which has a greater selectivity for methane than argon. The PSA vent stream 7 containing methane and nitrogen is usable as fuel for the ammonia plant. The product stream 8, comprising the predominant amount of argon, next enters a high pressure column 9, where cryogenic distillation, at a typical pressure of 400 psig, produces a top stream 10 of hydrogen containing a small amount of nitrogen, which may be recycled to the ammonia synthesis plant after being partly used as purge stream 4 for regeneration of unit 2. The bottoms product stream 11, containing the concentrated argon, next enters a second cryogenic distillation column 12, wherein remaining quantities of nitrogen and hydrogen exit the top of column 12 as gas stream 13. This may either be vented as a waste gas stream, used to purge the methane PSA unit 6, or used as fuel. The final product, essentially pure liquified argon, exits as stream 14 from the bottom of column 12. Argon yields of about 70 percent are obtainable at product methane concentrations of under about 20 ppm. High purity argon product containing less than 0.5 ppm methane can also be achieved.

In the first embodiment of the present invention, described above in reference to FIG. 1, the pressure swing adsorption (PSA) unit 2 can be made more effective by coupling with pressure reduction down to 400 psig, which is the operating pressure of the high pressure hydrogen separation column 9. Whereas the methane PSA unit operates at approximately 400 psig or above for the cryogenic hydrogen separation embodiment, much higher pressures, for example, approximately 1100 psig, are required for the embodiment shown in FIG. 2.

Figure 2:
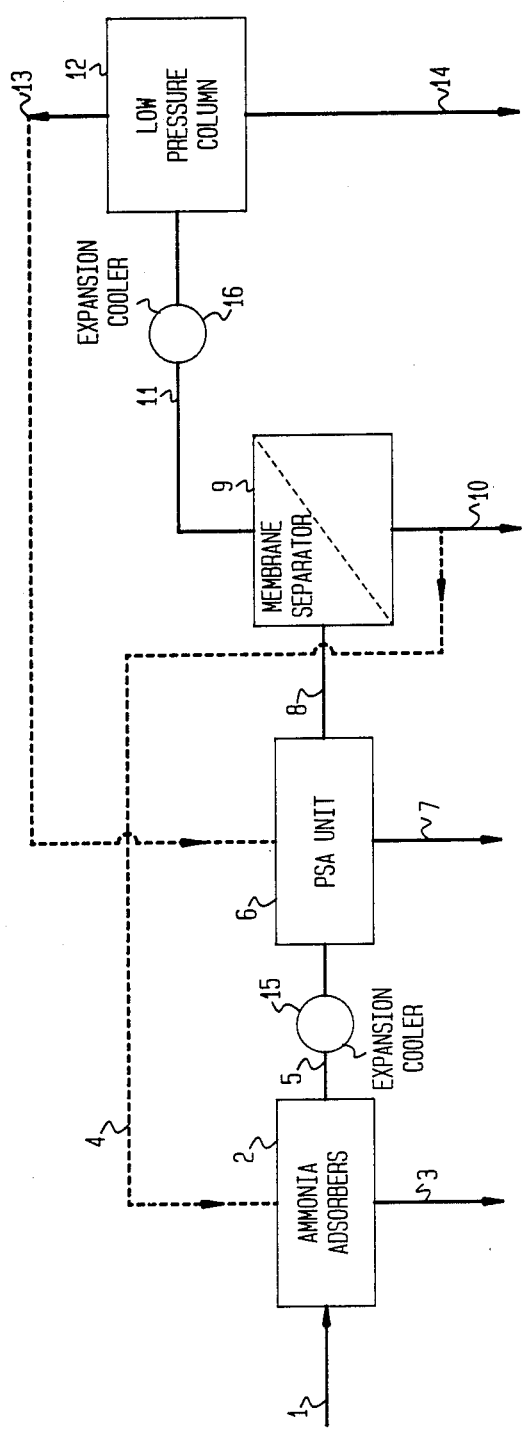
FIG. 2. discloses a schematic flow diagram according to a second embodiment of the present invention.

Referring now to FIG. 2, an alternative embodiment is shown in which the two column cryogenic separation described above, is modified to a single column separation by use of a hydrogen membrane separator.

In FIG. 2, numbered items 1 to 8 are the same as described above in reference to FIG. 1. Upon exiting from the PSA unit 6, however, the product stream 8 enters a hydrogen membrane separator 9, which removes hydrogen as permeate stream 10. A small part of the permeate is used as purge gas for regeneration of the ammonia adsorbing material. The non-permeate product stream 11 from the membrane separator 9, after being cooled by expansion means 16, next enters a cryogenic distillation column 12 in which an essentially pure liquid argon final product is obtained as bottoms stream 14. The more volatile nitrogen and hydrogen components of the product stream 11 exit from the top of the cryogenic distillation column 12, to form stream 13 which may be vented, used as purge gas for regeneration of the methane PSA unit 6, or used as fuel.

The ammonia adsorption unit 2 in FIG. 1 and FIG. 2, is suitably a three bed adsorber system described by Ruhemann (Petrocarbon Ltd.) in the article entitled "New developments in the treatment of ammonia purge gas", Indian J. Cryogenics 1982, Vol. 7, No. 3, pp 111-116. The three beds operate at very high pressures (typically 1100 psig) and may be regenerated with a hot purge gas comprised of a hydrogen-nitrogen mixture generated later in the overall process. The regenerated ammonia along with the purge gas is recycled to the ammonia synthesis loop.

Alternatively, it is also possible that the ammonia and methane adsorbers may be combined, in a PSA unit, provided the ammonia is not of much value. For low ammonia concentrations in the feed, this is often the case. In this case, regeneration is carried out at 25 psia or lower combined with purge. The vent stream may be used as a low BTU fuel.

The adsorbent material for the PSA unit 6 shown in FIG. 1 and FIG. 2 must have a greater selectivity for methane than argon. Both calcium and sodium aluminosilicate zeolites and activated carbons are suitable materials. Carbon molecular sieves and silica molecular sieves are also functional. Suitable zeolites include, but are not limited to the following: 5A, 10X, 13X or mordenites. Preferred zeolites are 5A medical grade zeolite sold by Union Carbide, the 5A HC sieve sold by LaPorte Industries or molecular sieves with comparable pore size and molecular attraction. The 5A medical grade zeolite was found to provide excellent argon-methane selectivity and to exhibit the ability to remove methane completely so that the PSA product gas will contain as low as fractional ppm levels. Removal of the methane to low levels is an important criterion; methane in the product gas would otherwise concentrate in the pure argon produced in the cryogenic section. Hence, expensive downstream purification steps would be required if the PSA product gas contains undesirable levels of methane. A methane level of less than 20 ppm is required and a level of less than 1 ppm is desired. A methane level of 0.5 ppm or below is preferred.

A suitable operating pressure in the PSA for methane separation is in a range of 50 psig to 1100 psig. A range of 400 to 1100 psig is preferred in order to maintain the pressure of the gases down stream and to avoid downstream recompression. A pressure of 400 to 600 psi is preferred for the first embodiment, whereas approximately 1100 psi is preferred for the second embodiment.

Figure 3:
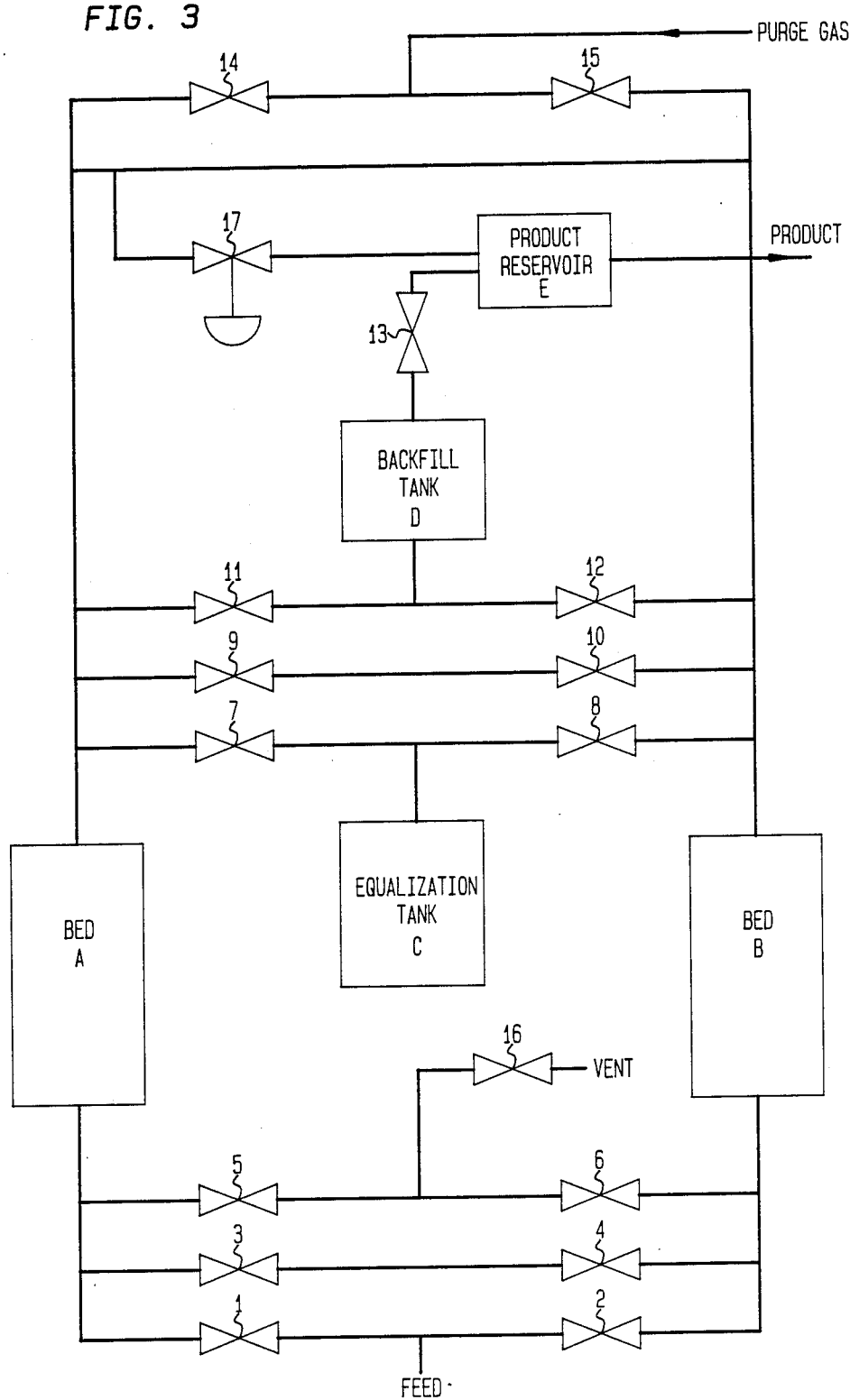
FIG. 3 discloses a schematic of a PSA unit illustrating valve positions and auxillary equipment according to one specific design.
Figure 4:
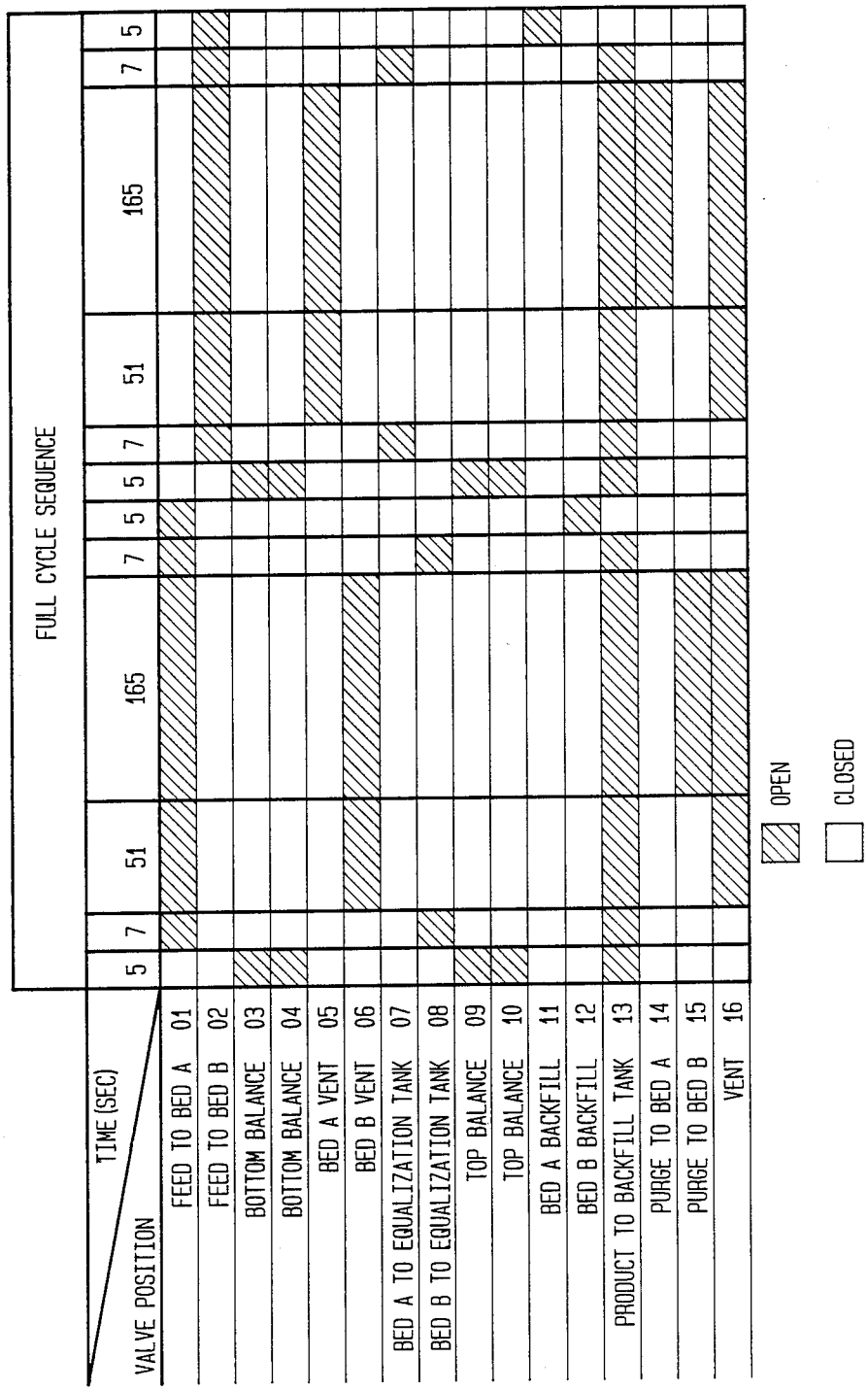
FIG. 4 is a timing diagram illustrating a full cycle sequence of PSA operation.

A typical PSA unit is shown in FIG. 3. In FIG. 3, items 1 to 16 represent conventional valves. Other items in the FIG. 3 are adsorption bed A, adsorption bed B, equalization tank C, backfill tank D, product reservoir E and backpressure valve 17. This PSA unit may be operated according to the full cycle sequence shown in Table I for a 2-bed PSA system with tank equalization, to reduce void gas loss, and with product backfill, to achieve desired purities. In FIG. 4, the timing sequence and valve position for each step of the sequence is shown.

TABLE I

| Step No. | Bed A | Bed B | Valves Open |
|---|---|---|---|
| 1 | Bed Balance | Bed Balance | 3,4,9,10,13 |
| 2 | Feed Pressurization | Equalization with Tank | 1,8,13 |
| 3 | Feed Pressurization | Vent | 1,6,16,13 |
| 4 | Constant Feed & Product | Vent & Purge | 1,6,15,16,13 |
| 5 | Constant Feed & Product | Equalization with Tank | 1,8,13 |
| 6 | Constant Feed & Product | Product Backfill | 1,12 |
| 7 | Bed Balance | Bed Balance | 3,4,9,10,13 |
| 8 | Equalization with Tank | Feed Pressurization | 2,7,13 |
| 9 | Vent | Feed Pressurization | 2,5,16,13 |
| 10 | Vent & Purge | Constant Feed & Product | 2,5,14,16,13 |
| 11 | Equalization with Tank | Constant Feed & Product | 2,7,13 |
| 12 | Product Backfill | Constant Feed & Product | 2,11 |

By varying the product to feed ratio either by changing product flow or cycle time, the argon yield at various operating pressures that corresponded to zero methane concentration in the product can be determined by thermal conductivity analysis of the PSA product stream in a gas chromatograph. There is a moderate reduction in argon yield with increasing pressure. The variation of argon yield with pressure indicates that the separation of methane is regeneration controlled; the higher the amount of methane regenerated, the better will be the argon-methane selectivity.

The PSA unit must be regenerated periodically. Typical modes of regeneration include (i) regeneration at tmospheric or slightly elevated pressures coupled with product purge, (ii) regeneration at atmospheric or slightly elevated pressures coupled with purge using hydrogen or a hydrogen-nitrogen mixture, and (iii) vacuum regeneration.

When using product purge, it is preferred to restrict the purge to different portions of the half cycle. Typically, the product released immediately after pressurization of the bed contains mostly hydrogen. The product released at the tail end of the production half cycle has minimum purity. To take account of this fact, two purge steps may be employed: the first purge step, immediately following pressurization of the adsorbing bed, and the second purge step towards the end of the half cycle. By suitable choice of time for the two purge steps, the maximum argon yield with this mode of regeneration can be obtained.

A disadvantage of product purge is low argon yield due to loss of the product purge gas itself. For separating all of the methane in the feed gas, the purge gas requirement is considerable and accounts for a large percentage of the argon lost.

An alternative to purge with product is purge with a gas available from a source external to the PSA; the hydrogen rich stream or the hydrogen-nitrogen mixture which are the distillate products from the two downstream columns can be effectively used for purge.

A third alternative mode of regeneration is vacuum regeneration. The yield obtained using vacuum regeneration is generally superior to the yield using purge. Vacuum regeneration, however, increases the capital investment for the process slightly and increases the energy requirement appreciably. Since the vent stream is used as a fuel, recompression to about 25 psia is also necessary unless special low pressure burners are installed. In determining the best regeneration procedure, the increase in argon yield that results with vacuum regeneration must be weighed against the incremental capital cost and energy requirements.

The operating pressures for the ammonia adsorber and the methane PSA unit are selected based on a typical ammonia plant design where the purge gas is available at about 2000 psia and the hydrogen rich recycle gas is required to be at 350 psia for introduction to the second stage ammonia compressors of the ammonia plant. It must be recognized that the process detailed here is applicable to any ammonia plant design; a suitable choice will have to be made for the pressures at various separation stages so that the recycle can be sent to the ammonia plant at a desired pressure.

The following working example illustrates a design based on actual plant data, experimental results, or, where appropriate, theoretical calculations assuming well mixed streams.

EXAMPLE 1

An ammonia purge gas stream comprising approximately 60.5% hydrogen, 20% nitrogen, 13% methane, 4.5% argon, and 2% ammonia enters a three bed ammonia adsorption unit containing 4 A molecular sieve material and operating at 1200 psig. This adsorption unit removes the ammonia and is periodically regenerated at 400 psig with a hydrogen rich purge stream. Ammonia rich vent is recycled to the synthesis compressor of the ammonia plant. After being cooled by expansion, the ammonia depleted stream, comprising 61.7% hydrogen, 20.5% nitrogen, 4.5% argon, and 13.3% methane, enters a PSA unit comprising two beds containing 5 A medical grade molecular sieve material. The operating pressure within the beds is approximately 450 psig during adsorption. This PSA unit removes essentially all of the methane and most of the nitrogen. The vent stream comprises 9.0% hydrogen, 48.1% nitrogen, 4.0% argon and 38.9% methane. The product stream, comprising 88.9% hydrogen, 4.9% argon, and 6.2% nitrogen, enters a cryogenic distillation column operating at 400 psig. This cryogenic distillation column produces a top product of hydrogen, capable of being recycled to the ammonia synthesis plant, and a bottoms product stream of concentrated argon. This product stream is cooled by expansion and next enters, at an operating pressure of about 30 psig, a second cryogenic distillation column which, after removing residual nitrogen and hydrogen as a distillate, produces a liquified argon final product. An argon yield of 68% with a methane concentration of 0.5 ppm is obtained.

Temperature, pressure, flow rate and composition of various streams are summarized in Table II.

TABLE II

| Stream (in FIG. 1) | Temp. (K.) | Pressure (psia) | Flow Rate (units/min) | Composition (mole percent) | | | |
|---|---|---|---|---|---|---|---|
| | | | | $H_2$ | Ar | $N_2$ | $CH_4$ |
| 1 | 250–293 | 1900 | 100.0 | 60.5 | 4.5 | 20 | 13 |
| 3 | 240–293 | 400–600 | 2.0 (+ Purge) | ($NH_3$ + Purge Gas) | | | |
| 5 | 250–293 | 400–1200 | 98.0 | 61.6 | 4.6 | 20.5 | 13.3 |
| 7 | 250–288 | Min 1.5 Max 25 | 33.4 | 9.0 | 4.0 | 48.1 | 38.9 |
| 8 | 298* | Min 400 Max 1200 | 64.6 | 88.9 | 4.9 | 6.2 | — |
| 10 | 87 | 400 | 57.2 | 98.8 | 0.1 | 1.1 | — |
| 11 | 108** | 400 | 7.4 | 12.4 | 41.4 | 46.2 | — |
| 13 | 83 | 25–60 | 4.3 | 20.9 | 1.3 | 77.8 | — |
| 14 | 98 | 25–60 | 3.1 | — | 100.0 | — | — |

*Precooled before entering column 9
**Cooled by expansion before entering column 12

In the PSA separation, methane and nitrogen are removed from the feed as vent gas. A certain amount of argon is lost with the vent gas. These losses arise because of two reasons: (i) argon is adsorbed in the sieves at the PSA operation pressure, and (ii) argon from the bed voids is discharged during pressure reduction. While maintaining the purity in the argon rich primary product, the once-through argon yield is typically about 70 percent. Certain process modifications which recycle all or part of the PSA vent gas result in an overall argon yield of 90 percent or better. Modifications to increase yield include the following: (i) vent gas recycle to the ammonia plant secondary reformer, (ii) vent gas recycle to the PSA unit, and (iii) recycle of cocurrent depressurization product to the PSA unit.

Figure 5:
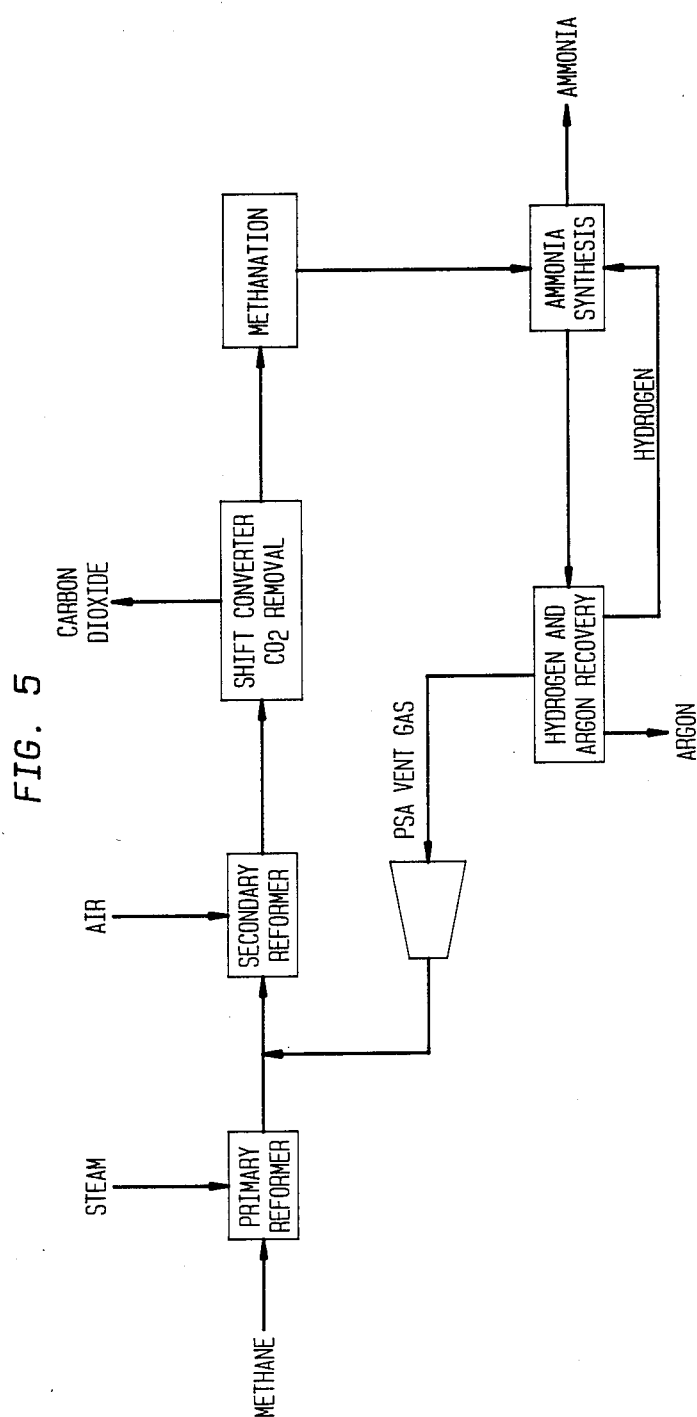
FIG. 5 is a schematic process flow diagam of a process according to the present invention employing a first recycle option: PSA vent gas to the ammonia plant secondary reformer.

First Recycle Option: Vent gas recycle to the ammonia plant secondary reformer involves pressurizing all or part of the PSA vent gas (250 to 525 psig depending on the specific ammonia plant design) and recycling it to the ammonia plant secondary reformer. A simplified flow sheet of the ammonia plant with this recycle option is shown in FIG. 5. It is possible to employ a total recycle option or a partial recycle option. In the total recycle option, all of the vent gas from the PSA beds employed to separate methane and nitrogen is recycled to the ammonia plant secondary reformer. The recycle stream will be about 2 to 3 percent by volume of the total dry gas entering the secondary reformer. The recycle stream provides methane for conversion to hydrogen in the secondary reformer as well as hydrogen and nitrogen. This will result in additional ammonia production which is of value to the ammonia plant. If it is desired to maintain the ammonia production level, the recycle stream will lead to fuel cost savings by cutting back on the natural gas fed to the process. If the purge gas rates are kept constant after the recycle, the argon concentration in the purge will increase. If the argon concentration in the ammonia synthesis loop has to be maintained at present levels, the purge flow has to be increased. In either case, changes to be incorporated in the ammonia plant are minimal because the volume of recycle gas is very small compared with the main flow in the secondary reformer. The total recycle option can completely eliminate PSA argon losses and result in a net argon yield greater than 90 percent.

It is also possible to collect the PSA vent gas in two fractions, thus leading to a partial vent gas recycle option. The first fraction is obtained by reducing pressure in the PSA beds from the equalized pressure to the regeneration pressure or somewhere in between the two. This fraction can contain from 50 to 80 percent of the total argon lost in the vent and is typically only 30 percent by volume of the total vent. The secondary vent fraction containing the regeneration gas and the desorbed gas is sent back as fuel gas to the ammonia plant. The first fraction is compressed to secondary reformer operating pressure and recycled. With this partial recycle option, net argon yield can be as high as 90 percent. The compression cost is less than the corresponding cost for the total recycle option. The recycle gas flow is less than one percent of the main flow into the secondary reformer to the ammonia plant and hence this option requires very little change in purge gas flow to maintain current inert levels.

Second Recycle Option: As noted above, the vent gas may be collected in two fractions. In the second recycle option, vent gas recycle to the PSA unit, the first fraction containing a major portion of the lost argon is compressed to PSA operating pressure and mixed with fresh feed to the PSA unit. The total feed to the PSA unit is increased and more methane needs to be processed as the methane removed as fuel gas in the secondary vent fraction must equal the methane in the fresh feed. With PSA recycle, overall argon yield can be increased to between 85 and 90 percent. Associated cost factors include compression of the recycle gas, additional load to the PSA unit and a moderate increase in nitrogen to be processed in the column.

In the partial recycle case, the pressure at which the first fraction is collected serves as a variable to control and maintain the quantity of gas to be recycled. There is a trade-off between the cost involved with recycling the gas and the value of the argon that is recovered by net yield improvement.

Third Recycle Option: In this recycle option, cocurrent depressurization product is recycled to the PSA unit. The PSA vent gas is normally collected in a direction countercurrent to the feed gas. During the production cycle, concentration fronts are formed for each of the components in the feed. Components that are strongly adsorbed (eg. methane) exist at feed concentration in the gas phase near the entrance of the bed. Over a length equal to the equilibrium saturation zone, the gas phase concentration is constant. Beyond this length the concentration decreases sharply. In the present separation (methane and nitrogen from the feed gas), it becomes necessary to halt the production of argon rich primary product when the equilibrium methane front is well within the PSA bed since only a fractional ppm level methane in the primary product can be tolerated. The product end of a PSA bed at the completion of the production step thus contains predominant amounts of argon which mainly accounts for the argon losses with the vent. It has been found to be desirable to collect a secondary product in a direction cocurrent to feed by moderate pressure reduction of the PSA beds, before countercurrent vent is initiated. The cocurrent product contains a significant amount of argon along with nitrogen and only a small amount of methane. The quantity of gas cocurrently produced and the methane concentration can be controlled by regulating the pressure at which this product is stopped. The total quantity of this product is only about 15 percent of the vent gas. Hence recycle of the cocurrent product rather than partial recycle of countercurrent vent gas reduces the compression cost and the incremental PSA cost. Typically, the cocurrent product contains half of the argon normally lost with the vent gas and hence overall argon yield can be increased to nearly 85 percent with this option.

EXAMPLE 2

Figure 6:
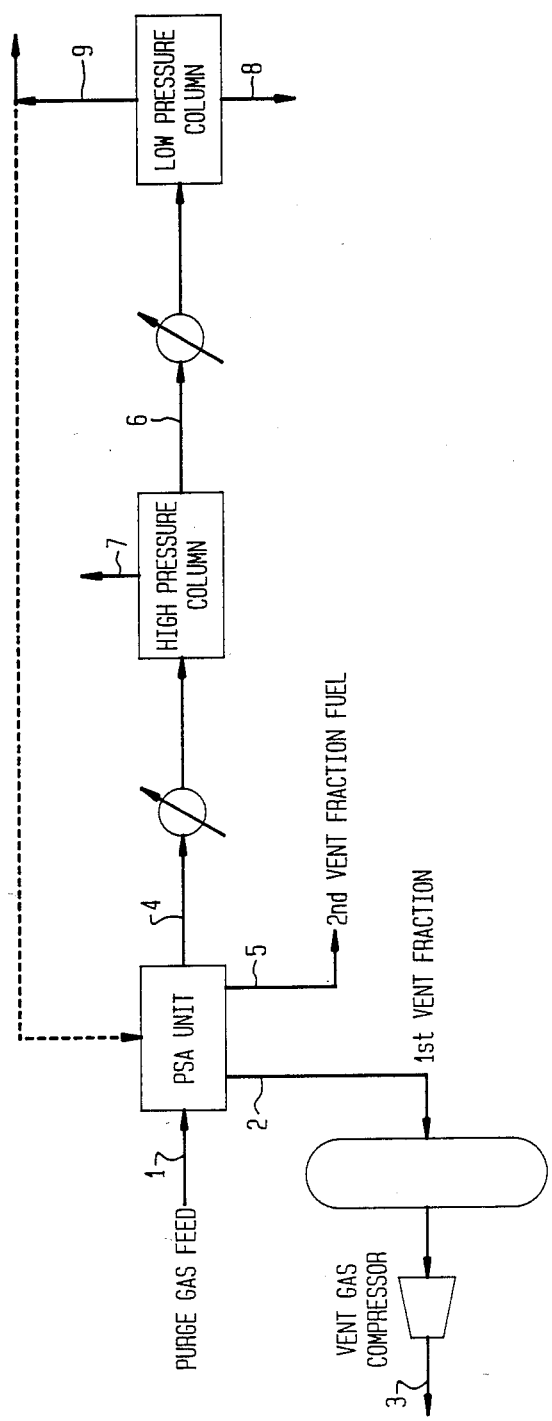
FIG. 6 is a more detailed portion of the process diagram of FIG. 5, showing flows to and from the PSA unit.
Figure 7:
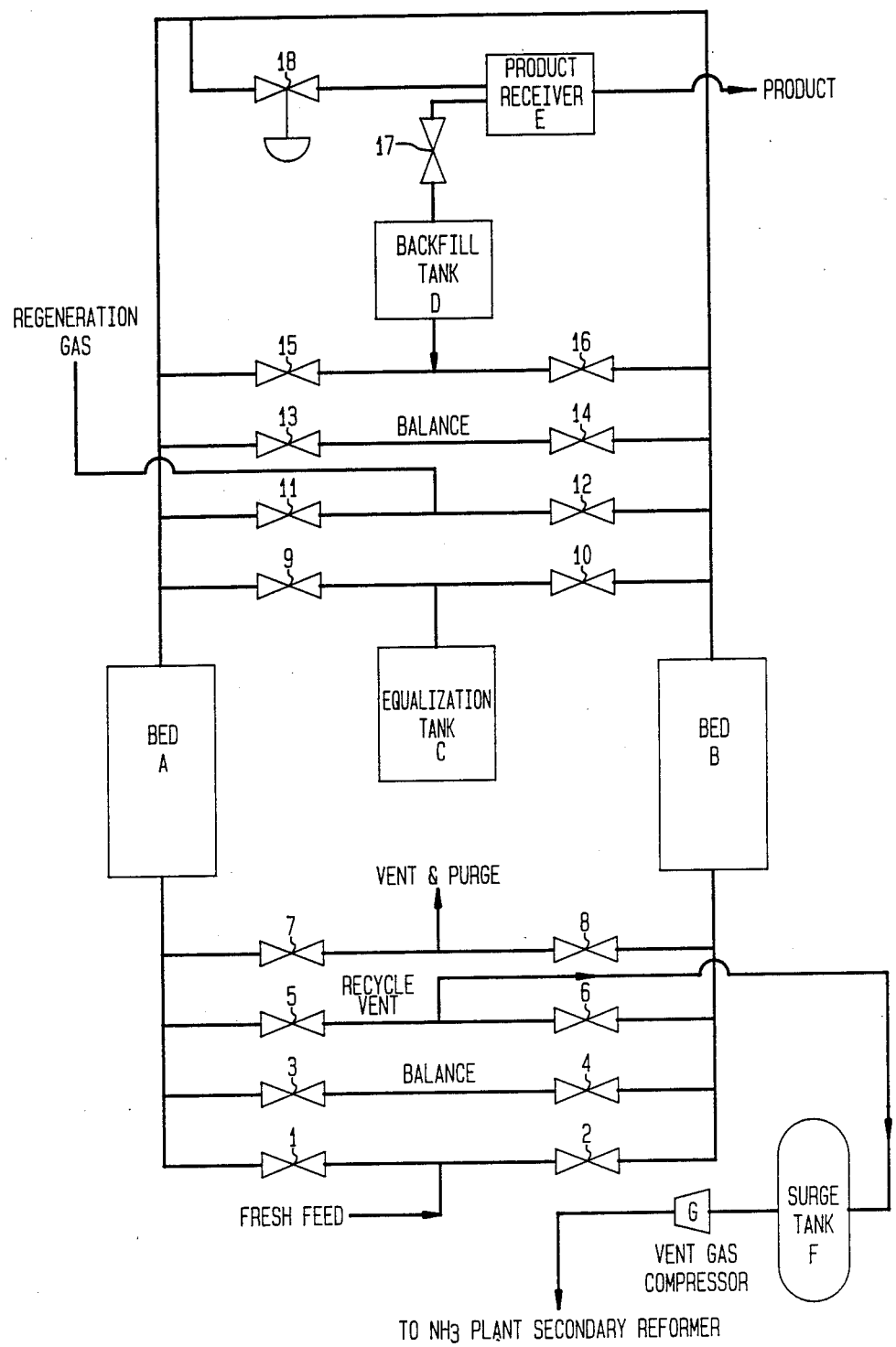
FIG. 7 is a schematic of one possible configuration of the PSA unit, illustrating valve positions and auxillary equipment, as employed in the first recycle option.

This example illustrates a process modification employing partial vent gas recycle to the ammonia plant secondary reformer which is schematically shown in FIG. 6. The first fraction of the PSA vent gas is collected in a surge tank, compressed to ammonia plant secondary reformer pressure (250-400 psia) and recycled. This recycle gas typically, constitutes only 2% or less of the main dry gas volumetric flow into the secondary reformer. The vent gas recycle to the secondary reformer enables the ammonia plant operator to cut the air flow to the compressor as well as the fuel ($CH_4$) to the process. The cut back in air and fuel will correspond to the quantity of nitrogen and methane equivalent in the recycle vent stream. The argon in the recycle stream concentrates in the ammonia plant and is recycled as feed to the argon recovery process, the feed thus becomes richer in argon. Typically, the argon concentration in the purge gas increases from 4.5 to 4.8 percent, whereas the total inert concentration (argon plus methane) increases from 17.5 to 17.8. A PSA configuration for this process modification is shown in FIG. 7. Referring to FIG. 7, the PSA unit comprises adsorption beds A and B, equalization tank C, backfill tank D, product reservoir E, recycle vent surge tank F, recycle compressor G, back pressure regulator 18 and solenoid valves 1 through 17. The accompanying full cycle sequence is given in the Table III below. The temperature and pressure conditions, flow rates and composition of various streams as referred in FIG. 6, are summarized in Table IV.

TABLE III

Cycle Sequence for PSA with Recycle

| Step no: | Bed A | Bed B | Valves Open |
|---|---|---|---|
| 1. | Bed balance | Bed balance | 3, 4, 13, 14, 17 |
| 2. | Equalization with tank | Product backfill | 9, 16 |
| 3. | Equalization with tank | Feed Pressurization | 2, 9, 17 |
| 4. | Vent to atmosphere | Constant feed & product release | 2, 5, 17 |
| 5. | Vent and purge | Constant feed & product release | 2, 7, 11, 17 |
| 6. | Equalization with tank | Constant feed & product release | 2, 9, 17 |
| 7. | Bed balance | Bed balance | 3, 4, 13, 14, 17 |
| 8. | Product backfill | Equalization with tank | 10, 15 |
| 9. | Feed pressurization | Equalization with tank | 1, 10, 17 |
| 10. | Constant feed & | Vent to atmosphere | 1, 6, 17 |

TABLE III-continued

Cycle Sequence for PSA with Recycle

| Step no: | Bed A | Bed B | Valves Open |
|---|---|---|---|
| 11. | Constant feed & product release | Vent and purge | 1, 8, 12, 17 |
| 12. | Constant feed & product release | Equalization with tank | 1, 10, 17 |

TABLE IV

Stream Conditions - Vent Gas Recycle to Ammonia Plant Secondary Reformer

| Stream (in FIG. 6) | Temp (K.) | Pressure (psia) | Flow Rate (units/min) | Composition (volume percent) | | | |
|---|---|---|---|---|---|---|---|
| | | | | $H_2$ | Ar | $N_2$ | $CH_4$ |
| 1 | 298.0 | 425.0 | 125.4 | 61.5 | 4.9 | 20.3 | 13.3 |
| 2 | 288.0 | Min 15 Max 100 | 23.8 | 8.9 | 6.2 | 42.8 | 42.1 |
| 3 | 303.0 | 250–400 | 23.8 | 8.9 | 6.2 | 42.8 | 42.1 |
| 4 | 298.0 | 410.0 | 82.7 | 88.6 | 5.2 | 6.2 | — |
| 5 | 288.0 | Min 1.5 Max 25 | 24.2 | 10.9 | 1.8 | 59.8 | 27.5 |
| 6 | 108.0 | 400 | 9.4 | 9.7 | 44.3 | 46.0 | — |
| 7 | 87.0 | 400 | 73.3 | 98.7 | 0.1 | 1.2 | — |
| 8 | 83.0 | 25–60 | 4.1 | — | 100.0 | — | — |
| 9 | 98.0 | 25–60 | 5.3 | 17.2 | 1.2 | 81.6 | — |

EXAMPLE 3

Figure 8:
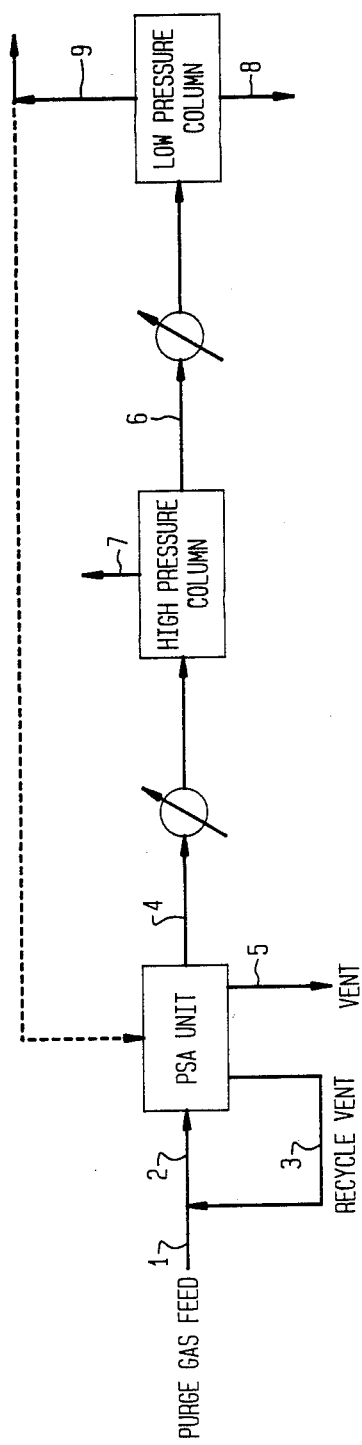
FIG. 8 is a schematic process flow diagram of a portion of a process according to the present invention employing a second recycle option: vent gas recycle to the PSA unit.

This example illustrates vent gas recycle for the PSA portion of the process, schematically shown in FIG. 8. A purge feed gas stream after ammonia removal, available at 425 psia, comprising 61.6 $H_2$, 20.5 $N_2$, 4.6 Ar and 13.3 percent $CH_4$ is mixed with compressed recycle vent gas and fed at ambient temperature to the PSA unit, comprising beds containing 5A Medical grade aluminosilicate zeolite. A typical PSA configuration depicting the various valves is the same as shown in FIG. 7 (in this case, however, the outlet of the vent gas recycle compressor is connected to the feed line). The PSA unit is operated in accordance with the full cycle sequence as shown in Table III above. The PSA vent gas is collected in two fractions; the first fraction merely by bed depressurization, while the second fraction by purge gas desorption along with the purge gas. The second fraction is used as fuel in the process, whereas the first fraction is collected in a surge tank, compressed to PSA operating pressure and mixed with the fresh feed to the process. The temperature and pressure conditions, flow rates and composition of various streams in FIG. 8, are summarized in Table V. FIG. 9 is a timing diagram of a process employing vent gas recycle to the PSA feed.

EXAMPLE 4

Figure 10:
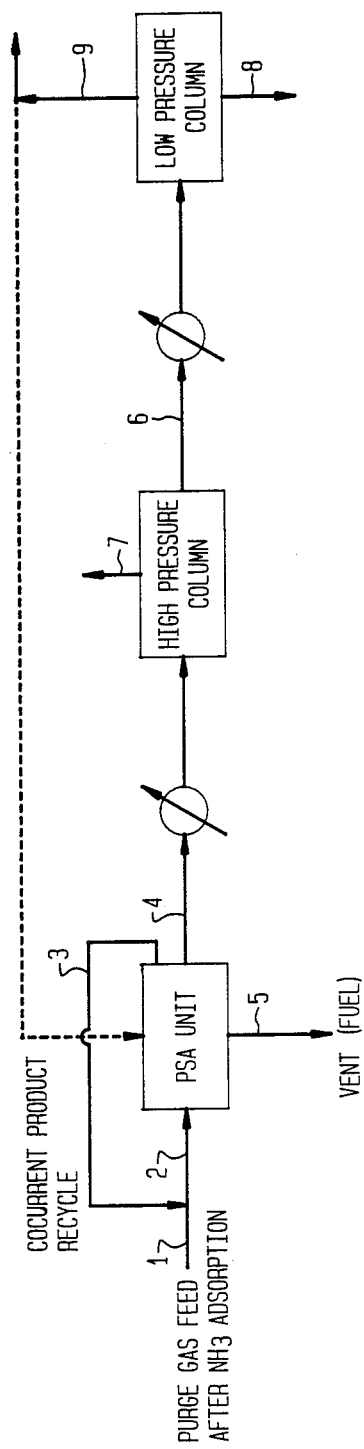
FIG. 10 is a schematic process flow diagram of a portion of a process according to the present invention employing a third recycle option: recycle of cocurrent depressurization product to the PSA unit.
Figure 11:
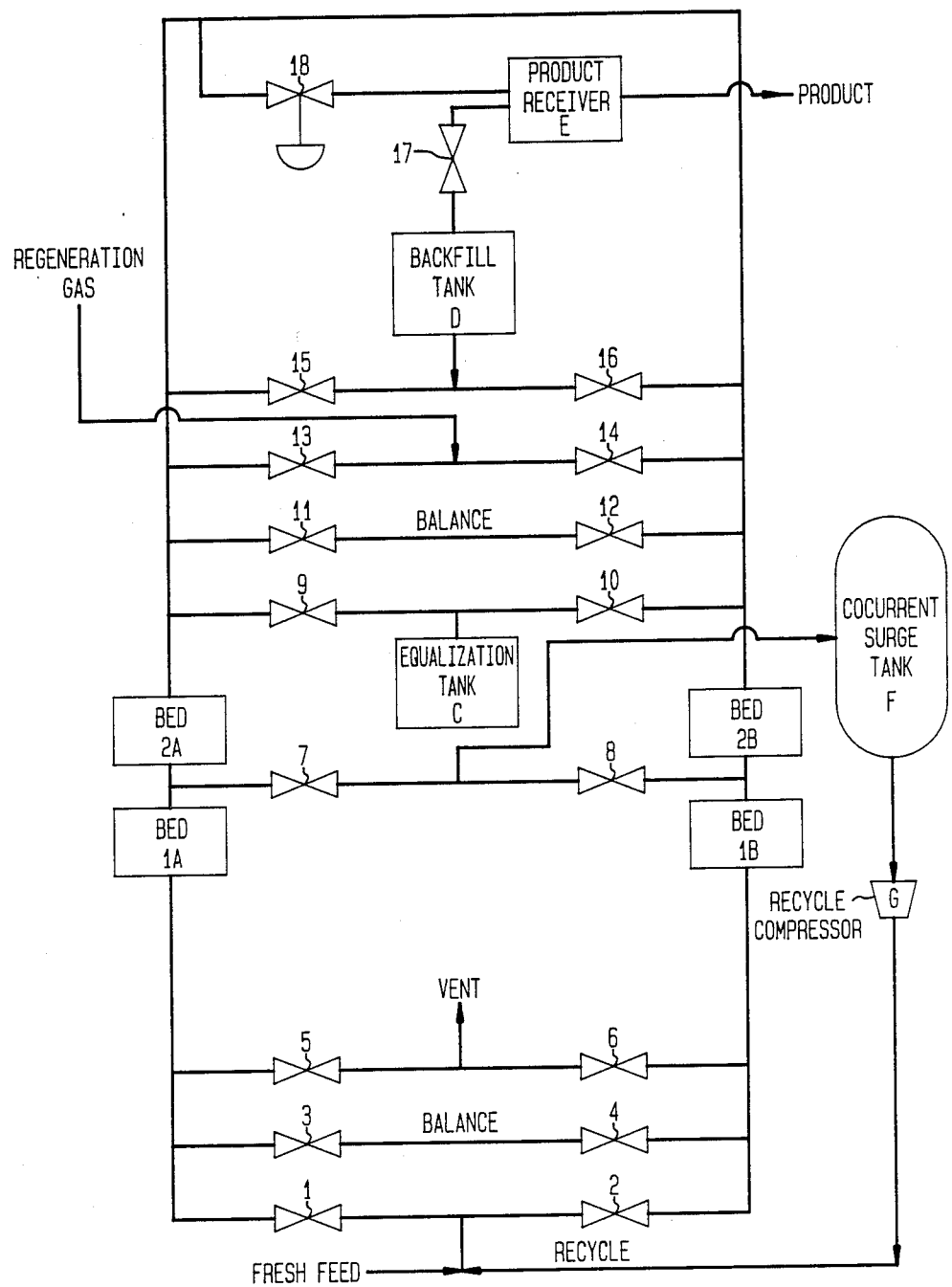
FIG. 11 is a schematic of one possible configuration of the PSA unit, illustrating valve positions and auxillary equipment, as employed in the third recycle option.

This example illustrates cocurrent product recycle, schematically shown in FIG. 10 for the PSA portion of the process. A purge gas feedstream after ammonia removal, comprising 61.6 $H_2$, 20.5 $N_2$, 46 Ar and 13.3. $CH_4$, at a pressure of 425 psia, is mixed with the cocurrent product recycle stream and fed at ambient temperature to the PSA unit, comprising beds containing 5A Medical grade aluminosilicate zeolite. A typical PSA configuration depicting the various valves is shown in FIG. 11. Referring to FIG. 11, the PSA unit comprises adsorption bed A, adsorption bed B, equalization tank C, backfill tank D, product reservoir E, cocurrent product surge tank F, recycle compressor G, back pressure regulator 18 and solenoid valves 1 through 17.

Figure 12:
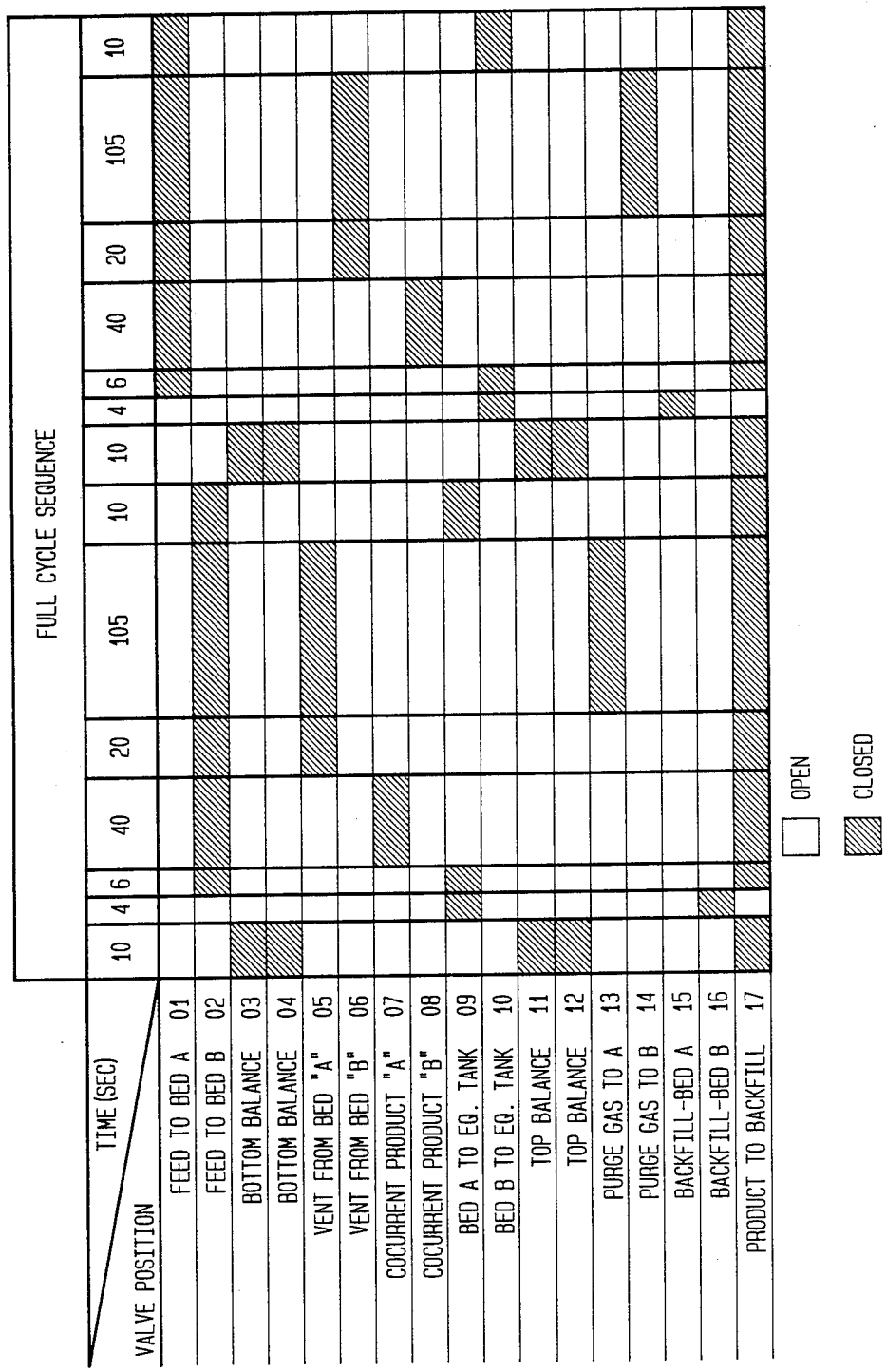
FIG. 12 is a timing diagram illustrating a full cycle sequence of PSA operation corresponding to the configuration shown in FIG. 11 and employing the third recycle option.

The beds A and B are physically divided into two vessels 1A, 2A and 1B, 2B to facilitate removal of the cocurrent product stream from an intermediate position in the bed. The cocurrent product is drawn at an intermediate pressure (for example, 45 psia) and compressed to PSA operating pressure before being mixed with fresh feed. The PSA unit is operated in accordance with the full cycle sequence shown in Table VI below. FIG. 12 shows a timing diagram for the full cycle sequence. The temperature and pressure conditions, flowrates and composition of various streams in FIG. 10, are summarized in Table VII.

TABLE VI

Cycle Sequence for PSA with Cocurrent Product Recycle

| | Bed A | Bed B | Valves Open |
|---|---|---|---|
| 1. | Bed balance | Bed balance | 3, 4, 11, 12, 17 |
| 2. | Equalization with tank | Product backfill | 9, 16 |
| 3. | Equalization with tank | Feed Pressurization | 2, 9, 17 |
| 4. | Cocurrent production | Constant feed & product release | 2, 7, 17 |

TABLE V

Stream Conditions - Vent Gas Recycle to PSA Feed

| Stream (in FIG. 8) | Temp (K.) | Pressure (psia) | Flow Rate (units/min) | Composition (volume percent) | | | |
|---|---|---|---|---|---|---|---|
| | | | | $H_2$ | Ar | $N_2$ | $CH_4$ |
| 1 | 298 | 425 | 98.0 | 61.6 | 4.6 | 20.5 | 13.3 |
| 2 | 298 | 425 | 134.5 | 46.3 | 4.4 | 24.9 | 24.2 |
| 3 | 288 | 425 | 36.5 | 4.6 | 5.3 | 36.7 | 53.4 |
| 4 | 303 | 410 | 71.2 | 84.8 | 5.8 | 9.4 | — |
| 5 | 288 | Min 1.5 Max 25 | 33.3 | 3.0 | 1.1 | 56.7 | 39.2 |
| 6 | 108.0 | 400 | 10.5 | 7.5 | 38.3 | 54.2 | — |
| 7 | 87.0 | 400 | 60.7 | 98.1 | 0.2 | 1.7 | — |
| 8 | 83.0 | 25–60 | 4.0 | — | 100.0 | — | — |
| 9 | 98.0 | 25–60 | 6.5 | 12.1 | 0.6 | 87.3 | — |

TABLE VI-continued

Cycle Sequence for PSA with Cocurrent Product Recycle

| | Bed A | Bed B | Valves Open |
|---|---|---|---|
| 5. | Vent to atmosphere | Constant feed & product release | 2, 5, 17 |
| 6. | Vent and purge | Constant feed & product release | 2, 5, 13, 17 |
| 7. | Equalization with tank | Constant feed & product release | 2, 9, 17 |
| 8. | Bed balance | Bed balance | 3, 4, 11, 12, 17 |
| 9. | Product backfill | Equalization with tank | 10, 15 |
| 10. | Feed pressurization | Equalization with tank | 1, 10, 17 |
| 11. | Constant feed & product release | Cocurrent production | 1, 8, 17 |
| 12. | Constant feed & product release | Vent to atmosphere | 1, 6, 17 |
| 13. | Constant feed & product release | Vent and purge | 1, 6, 14, 17 |
| 14. | Constant feed & product release | Equalization with tank | 1, 10, 17 |

TABLE VII

Stream Conditions - Cocurrent Product Recycle Process

| Stream (in FIG. 10) | Temp (K.) | Pressure (psia) | Flow Rate (units/min) | Composition (volume percent) | | | |
|---|---|---|---|---|---|---|---|
| | | | | $H_2$ | Ar | $N_2$ | $CH_4$ |
| 1 | 298.0 | 425 | 98.0 | 61.6 | 4.6 | 20.5 | 13.3 |
| 2 | 298.0 | 425 | 108.4 | 58.0 | 5.0 | 24.1 | 12.9 |
| 3 | 298.0 | 425 | 10.4 | 24.1 | 8.8 | 58.0 | 9.1 |
| 4 | 303.0 | 410 | 69.4 | 87.0 | 5.4 | 7.6 | — |
| 5 | 293.0 | Min 1.5 Max 25 | 32.6 | 9.2 | 2.3 | 48.5 | 40.0 |
| 6 | 108.0 | 400 | 10.5 | 23.0 | 35.1 | 41.9 | — |
| 7 | 87.0 | 400 | 58.9 | 98.5 | 0.1 | 1.4 | — |
| 8 | 83.0 | 25-60 | 3.6 | — | 100.0 | — | — |
| 9 | 98.0 | 25-60 | 6.9 | 35.6 | * | 64.6 | — |

*Trace quantity

We claim:

1. A process for the recovery of argon from a gas mixture comprising hydrogen, nitrogen, methane, argon, and ammonia, the steps comprising:
   (i) Passing said gas mixture to a means for removing ammonia to produce an ammonia depleted gas mixture
   (ii) passing said ammonia depleted gas mixture to a pressure swing adsorption means for removing essentially all of the methane and most of nitrogen thus producing a gas mixture depleted in methane;
   (iii) passing said gas mixture to a means for removing most of the hydrogen thus producing a product stream depleted in hydrogen; and
   (v) passing said stream to a cryogenic distillation column for the separation of remaining amounts of hydrogen and nitrogen to produce a high purity argon product; the process further comprising recycling all or part of the vent gas from the pressure swing adsorption means into the process or, in the event said gas mixture is the purge gas from an ammonia synthesis plant, to said plant.

2. The process of claim 1, wherein said vent gas is recycled into the process to the pressure swing adsorption means via the feed stream thereto.

3. A process in accordance with claim 2, wherein the vent gas is collected in two fractions, the first fraction is recycled to the pressure swing adsorption means and the second fraction is used for fuel in said process.

4. The process of claim 1, wherein the ammonia synthesis plant includes a secondary reformer, and said vent gas is recycled to said secondary reformer.

5. The process of claim 4, wherein the vent gas is collected in two fractions, the first fraction is recycled to the secondary reformer and the second fraction is used for fuel in said plant.

6. A process for the recovery of argon from a gas mixture comprising hydrogen, nitrogen, methane, argon, and ammonia, the steps comprising:
   (i) Passing said gas mixture to a means for removing ammonia to produce an ammonia depleted gas mixture;
   (ii) passing said ammonia depleted gas mixture to a pressure swing adsorption means for removing essentially all of the methane and most of nitrogen thus producing a gas mixture depleted in methane;
   (iii) passing said gas mixture to a means for removing most of the hydrogen thus producing a product stream depleted in hydrogen; and
   (iv) passing said stream to a cryogenic distillation column for the separation of remaining amounts of hydrogen and nitrogen to product a high purity argon product; the process further comprising recycling into said process a cocurrent depressurization product from the pressure swing adsorption means employed for methane removal in step (ii).

7. The process of claim 6, wherein the cocurrent depressurization product for recycle is obtained from the product end of the said pressure swing adsorption means.

8. The process of claim 6, wherein the cocurrent depressurization product for recycle is obtained from an intermediate location on the pressure swing adsorption means.

9. The process of claims 1 or 6, wherein said means for removing ammonia comprises a zeolite adsorption bed.

10. The process of claims 1 or 6, wherein said zeolite adsorption bed operates at a pressure in the range of 400 to 1900 psig.

11. The process of claims 1 or 6, wherein regeneration of said zeolite adsorption bed is carried out by passing a hot mixture of nitrogen and hydrogen gas through said adsorption bed at the same or reduced pressure.

12. The process of claims 1 or 6, wherein said means for removing hydrogen is a membrane separator.

13. The process of claims 1 or 6, wherein said means for removing hydrogen is a high pressure cryogenic distillation column.

14. The process of claims 1 or 6, wherein the methane concentration in said argon product is equal to or less than 20 ppm.

15. The process of claims 1 or 6, wherein the methane concentration in said argon product is equal to or less than 1 ppm.

16. The process of claims 1 or 6, wherein said argon product is a liquid.

17. The process of claims 1 or 6, wherein said means for removing essentially all of the methane and most of the nitrogen comprises at least one adsorption bed containing an adsorbent material which exhibits a greater selectivity for methane than argon.

18. The process of claim 17, wherein said adsorption bed operates at a pressure in the range 400 to 1100 psig.

19. The process of claim 17, wherein said adsorbent material is an activated carbon.

20. The process of claim 17, wherein said adsorbent material is a molecular sieve.

21. The process of claim 20, wherein said molecular sieve is an aluminosilicate zeolite.

22. The process of claim 21, wherein said aluminosilicate is selected from the group consisting of 5A, 10X, 13X or mordenites.

23. The process of claim 22, wherein said aluminosilicate zeolite is 5A medical grade sieve or 5A HC sieve.

* * * * *